United States Patent [19]

Krounbi et al.

[11] Patent Number: 5,458,908
[45] Date of Patent: Oct. 17, 1995

[54] METHOD OF FABRICATING A MAGNETORESISTIVE READ TRANSDUCER

[75] Inventors: Mohamad T. Krounbi; Kenneth T. Kung, both of San Jose; Ching H. Tsang, Sunnyvale, all of Calif.

[73] Assignee: International Business Machines Corporation, Armonk, N.Y.

[21] Appl. No.: 310,906

[22] Filed: Sep. 21, 1994

Related U.S. Application Data

[63] Continuation of Ser. No. 18,613, Feb. 17, 1993, abandoned.

[51] Int. Cl.$^6$ ..................................................... B05D 5/12
[52] U.S. Cl. ..................... 427/123; 427/131; 427/132; 427/264; 427/265; 427/270; 427/272; 427/282
[58] Field of Search ..................................... 427/127–132, 427/123, 264, 265, 270, 272, 282; 428/900, 928, 693, 699; 360/113

[56] References Cited

U.S. PATENT DOCUMENTS

| | | | |
|---|---|---|---|
| 4,130,847 | 12/1978 | Head et al. | 360/113 |
| 4,197,987 | 4/1980 | Lazzari | 360/113 |
| 4,771,349 | 9/1988 | Krounbi | 360/113 |
| 5,014,147 | 5/1991 | Parkin et al. | 360/113 |
| 5,018,037 | 5/1991 | Krounbi et al. | 360/113 |
| 5,155,642 | 10/1992 | Voegeli | 360/113 |

OTHER PUBLICATIONS

Tsang et al., Temperature Dependence of Unidirectional Anisotropy Effects in the Permalloy–FeMn Systems, Journal of Applied Physics, Mar. 1982, pp. 2605–2607.

Tsang et al., Exchange Induced Unidirectional Anistropy at FeMn Ni$_{80}$Fe$_{20}$ Interfaces, Journal of Applied Physics, Mar. 1981, pp. 2471–2473.

*Primary Examiner*—Bernard Pianalto
*Attorney, Agent, or Firm*—Henry E. Otto, Jr.

[57] ABSTRACT

A magnetoresistive (MR) read transducer assembly having passive end regions separated by a central active region, and a method of fabricating it. Layers of a first biasing material and a nonmagnetic decoupling spacer material are deposited on a substrate, then covered by a mask only in the central region. By etching or ion milling, those parts of the layers not covered by the mask are removed to define a transverse biasing means in the central region and define the passive end regions. With the same mask remaining in place, a conductive material and exchange layer comprising a second biasing material are deposited over all regions. The mask is removed to define and provide conductor leads and longitudinal biasing means only in the end regions. MR material is thereafter deposited as a continuous thin film in direct contact with the central region containing the transverse biasing means and in direct contact with the end regions containing the longitudinal biasing means. This fabrication technique has no critical etching steps requiring stopping at or near a particular interface and the MR film provides a continuous platform for carrying current without butted junctions in the current path.

10 Claims, 3 Drawing Sheets

METHOD OF FABRICATING A MAGNETORESISTIVE READ TRANSDUCER

This application is a continuation of application Ser. No. 08/018,613, filed on Feb. 17, 1993, abandoned, entitled "Magnetoresistive (MR) Read Transducer With Last-Deposited Continuous MR Layer", in the name of Mohamad Towfik Krounbi, Kenneth Ting-Yuan Kung, and Ching Hwa Tsang.

FIELD OF THE INVENTION

This invention relates to magnetoresistive (MR) read transducers for use in thin film magnetic heads for reading data from magnetic storage devices, and relates more particularly to an MR transducer and a method of fabricating same in which an MR material layer is deposited as a continuous thin film across the entire width of the transducer at the end of the fabrication process.

BACKGROUND OF THE INVENTION

An MR read transducer requires an active region and passive regions. The active region comprises suitable means for transversely biasing the transducer, and each passive region comprises one of a pair of conductor leads and generally suitable means for longitudinally biasing the transducer.

The most pertinent prior art known to applicants is U.S. Pat. No. 4,771,349. This patent discloses (in FIG. 2) an MR read transducer having passive end regions separated by a central active region. A continuous thin film of MR material is first deposited over both the central region and end regions. A nonmagnetic spacer layer and a soft magnetic bias layer are deposited and are then patterned to cover only the central active region for imparting a transverse bias to the transducer. A longitudinal magnetic bias layer and conductive leads extend over only the end regions of the transducer. This bias layer creates an interfacial exchange interaction with the MR film that results in an effective bias field that is oriented longitudinally for domain suppression.

While this transducer operates satisfactorily, it is relatively difficult to fabricate for the following reason. It is made by applying a mask or "stencil" over the soft magnetic layer and nonmagnetic spacer layer and etching or ion milling to remove these layers outside the mask to define the central region. The problem is that the MR film is generally very thin (e.g., less than 200Å) and it is difficult to stop the etching or milling with a precision that is high with respect to the thickness of the thin MR film. Failure to completely remove the spacer layer in the end regions can render the transducer inoperative; whereas if part of the thin MR film is inadvertently removed, the consequent reduction in its thickness can undesirably impact the sensing characteristics of the transducer. If an attempt is made to restore the MR film to proper thickness by redeposition of MR material, it is difficult to determine how much to deposit because it is difficult to determine in situ how much material was removed. This difficulty in fabrication is also due in part to the fact that the film of MR material is deposited on the substrate as the first step in the fabrication process.

U.S. Pat. No. 5,014,147 (in FIG. 4) discloses an MR transducer in which a soft magnetic bias layer is deposited on a substrate, and covered in turn by a nonmagnetic spacer layer, an MR layer, an antiferromagnetic layer and conductor leads. This patent also discloses (in FIG. 6) an MR transducer in which a longitudinal hard bias layer is deposited upon an auxiliary layer and an MR layer is deposited upon the bias layer, followed by a spacer layer, a soft magnetic bias layer and conductor leads. In these embodiments and also in a variation shown in FIG. 8, all the layers extend the full length of the transducer except for the conductor leads. However, the principal disadvantage of this configuration is that the transducer is longitudinally biased over its entire length, which degrades its transverse bias performance and its signal sensitivity.

U.S. Pat. No. 5,018,037 discloses an MR read transducer in which an MR layer, a spacer layer of nonmagnetic material and a soft magnetic bias layer are formed as full films and then patterned to cover only a central active region of the transducer. Longitudinal bias layers and conductor leads are then formed in end regions only of the transducer. Note (in FIG. 5) the butted junction in the current path between the MR layer and hard magnetic bias layer. Thus the transducer is composite of three abutting sections which can impact the reliability of the transducer and introduce complications in the magnetic and electrical behavior at the junctions of these sections.

Two papers by Tsang, et al. were published in Journal of Applied Physics: (I) in March 1981 at pp. 2471 et seq. and (II) in March 1982 at pages 2605 et seq. Paper (I) discloses use of a NiFe/MnFe/NiFe composite film as an exchange layer in an MR transducer and suggested that such a film would suppress Barkhausen noise. However, it does not disclose or suggest how this exchange layer may be incorporated in an MR read transducer of the type disclosed by applicants. Paper (II) indicated that an exchange structure comprising an MnFe film below (instead of above) a Cu seed layer provided higher exchange magnitude and coercivity at room temperature, higher blocking temperature ($T_c$), and lower exchange roll off as a function of temperature. However, this paper did not disclose or suggest use of an NiFe film as a seed layer with an MnFe film in an MR read transducer of the type disclosed by applicants.

None of these references discloses or suggests an MR transducer structure in which an MR layer is deposited as a continuous film across the entire width of the transducer during the last step in the fabrication process. This desirably (a) produces an MR transducer with an MR film that provides a continuous current-carrying platform without butted junctions in the current path; and (b) facilitates fabrication by eliminating all etching steps that might require stopping the etching process at a critical interface.

SUMMARY OF THE INVENTION

An MR read transducer has a transversely biased central active region separated by longitudinally biased passive end regions. The transducer is fabricated by first depositing a transversely biasing layer on a suitable substrate, then covering it with a nonmagnetic spacer layer. A photoresist mask is then used in a subtractive mode to pattern these layers, such as by etching or ion milling, to cover only the central active region. After the patterning step the same mask is used in an additive mode to deposit only in the end regions conductor leads and then to deposit only in the end regions a longitudinally biasing exchange layer in contact with the conductor leads. After liftoff of the photoresist mask, an MR layer is deposited as a continuous film across the full width of the transducer in direct contact with the exchange layer in the end regions and in direct contact with the nonmagnetic spacer layer in the central active region.

This fabrication technique has no critical etching steps requiring stopping at or near a particular interface and the MR layer constitutes a continuous platform for carrying current. Since the MR layer is on top of the structure, a capping layer can also be deposited to protect the MR layer during subsequent processing.

The transversely biasing layer preferably is a soft magnetic biasing material but may be a conductive shunt layer or hard magnetic biasing material. The longitudinally biasing exchange layer preferably is a NiFe/MnFe/NiFe structure but the NiFe seed layer may be replaced, if desired, by any appropriate face-centered cubit (or fcc) metal. Alternatively, the longitudinal biasing layer may be a hard magnetic bias material or other antiferromagnetic material.

DESCRIPTION OF PREFERRED EMBODIMENTS

Figure 1A:
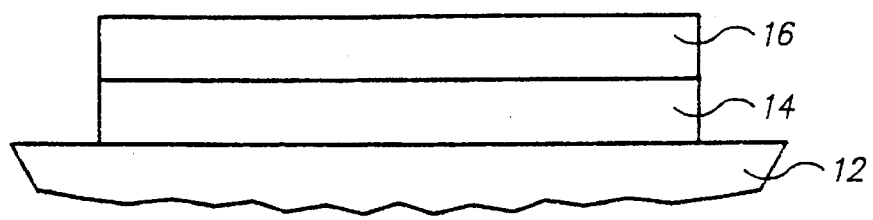
FIG. 1A, 1B, 1C, 1D and 1E depict the sequence of steps in fabricating an MR read transducer embodying the invention.
Figure 1B:
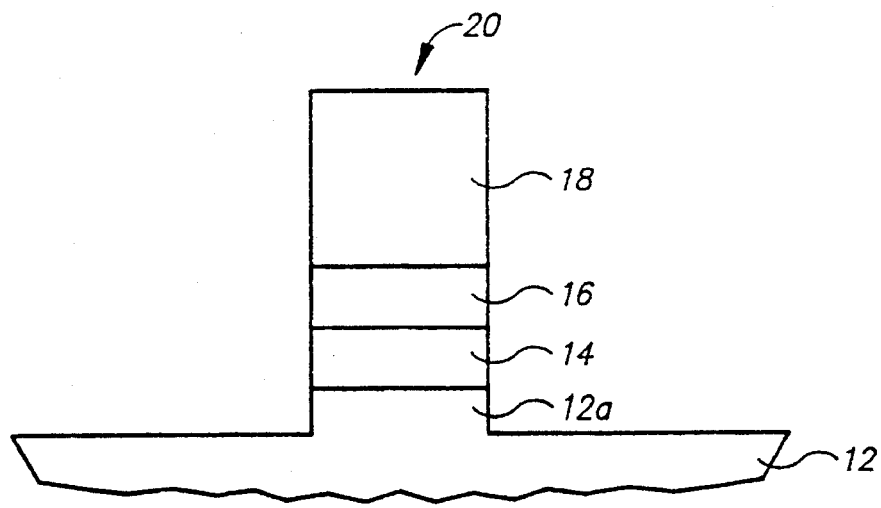
Figure 1C:
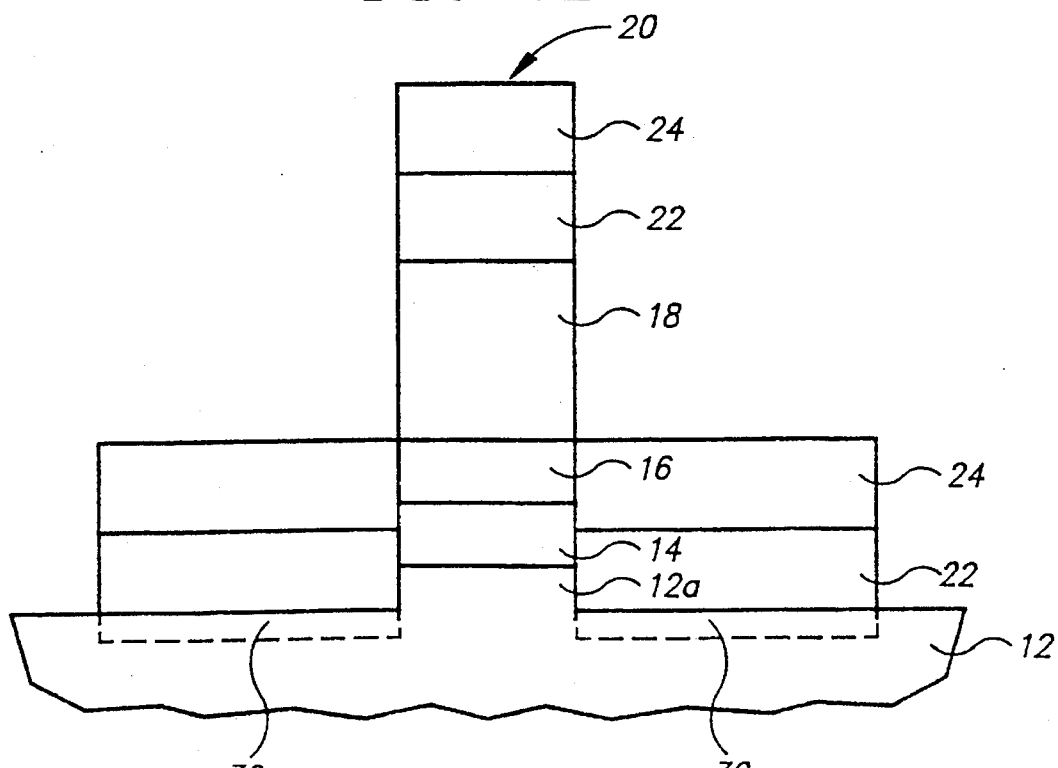
Figure 1D:
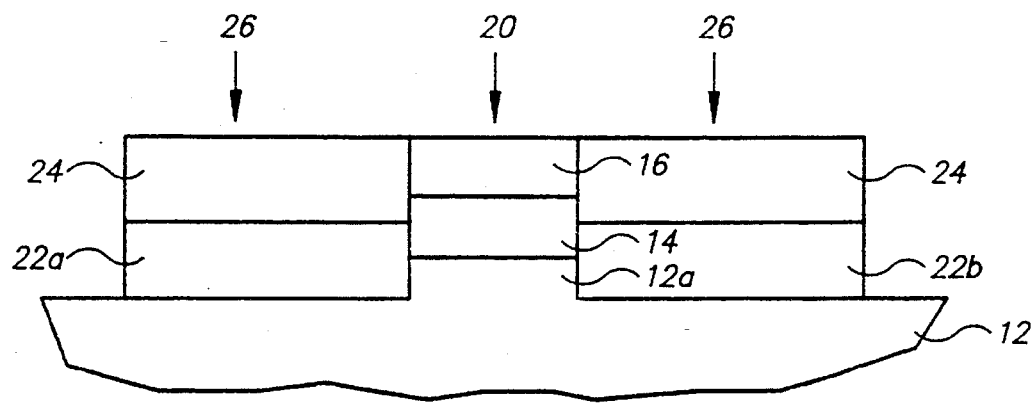
Figure 1E:
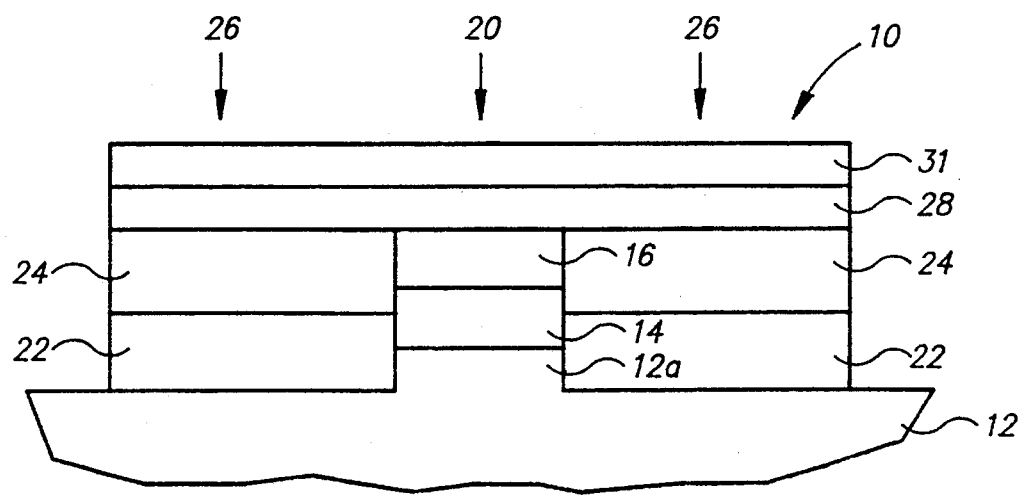
Figure 2:
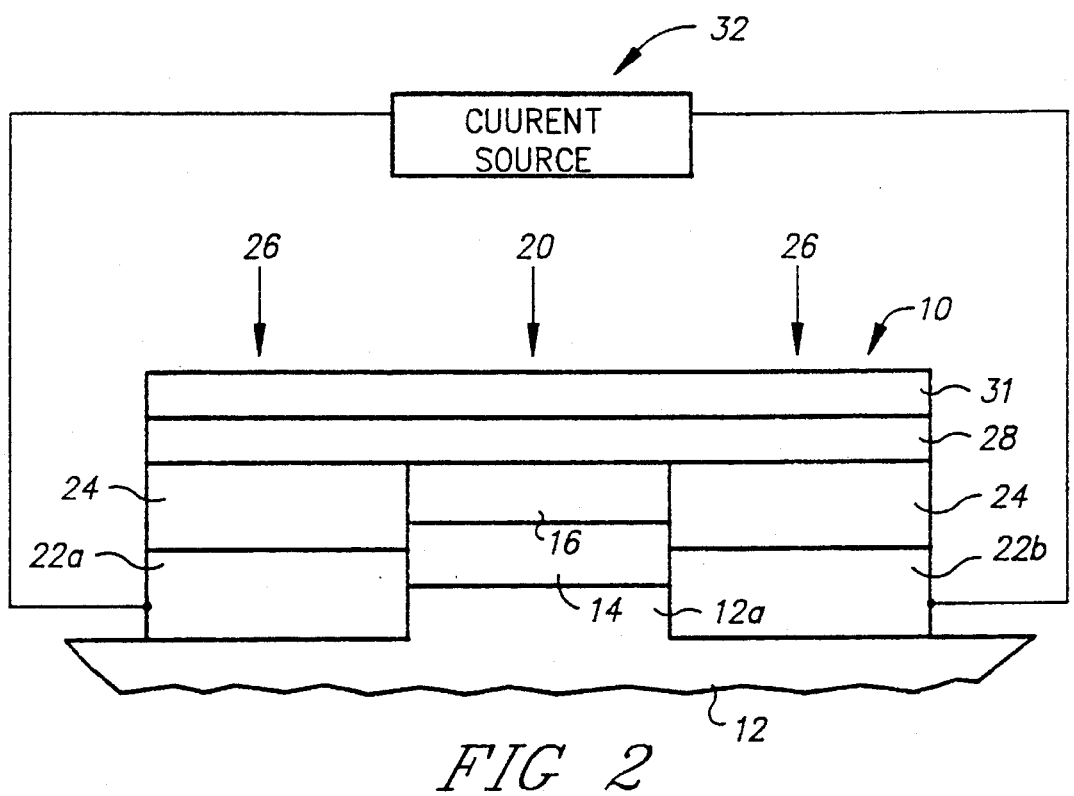
FIG. 2 is an end view of an MR read transducer assembly according to one specific embodiment of the invention.

FIGS. 1A, 1B, 1C, 1D, and 1E show sequentially the steps in the method by which the MR read transducer assembly 10 shown in FIG. 2 and embodying the invention is fabricated. As illustrated, the method comprises the steps of depositing on a suitable dielectric substrate 12 a layer 14 of soft magnetic material and then a decoupling spacer layer 16 of nonmagnetic material (FIG. 1A).

A suitable photoresist mask 18 is then placed over a portion of spacer layer 16, and the parts of the layers 14, 16 outside the mask are removed, as by etching or ion milling, to define what will become the central active region 20 of the transducer. It is essential that all of the soft magnetic layer 14 not covered by mask 18 be completely removed during this subtractive process. Hence, in practice, it is customary to slightly undercut the substrate 12, resulting in a "pedestal" 12a (FIG. 1B).

With mask 18 remaining in place, a layer 22 of conductive material and then an exchange layer 24 of a magnetic bias material are deposited on the substrate 12 and mask (FIG. 1C). An optional planarizing layer 30 of dielectric material may be deposited only in the end regions 26 using mask 18, if necessary to backfill for excessive removal of substrate 12 material.

After lift off of the resist mask 18, the superposed layers 22, 24 to either side of central region 20 will define passive 20 end regions 26 of the transducer having conductor leads 22a, 22b and exchange layers 24 separated by the central region (FIG. 1D). A layer 28 of MR material is then deposited as a continuous thin film over both the central region 20 and end regions 26, and may be covered if desired by a capping layer 31 of protective material to protect the MR film during subsequent processing (FIG. 1E).

FIG. 2 depicts the MR transducer 10 embodying the invention as fabricated by the method described in connection with FIG. 1. As illustrated in FIG. 2, an MR read transducer assembly comprises a bias current source 32 connected between conductor leads 22a, 22b to provide a bias current in central region 20 of the transducer. This current magnetically biases the transducer with a transverse bias only at the central region 20 for producing a linear response mode of the transducer. The exchange layer 24 longitudinally biases only the end regions 26 of the transducer for domain suppression.

In the specific embodiment of the transducer 10 depicted in FIG. 2, the material used for soft magnetic film layer 14 was NiFeRh, for the spacer layer 16 was Ta, for the exchange layer 24 was NiFe/MnFe/NiFe, and for the MR layer was NiFe.

If desired, the central active region 20 may be transversely biased by substituting for soft magnetic layer 14 either a hard magnetic bias material (not shown), such as a permanent magnet, or a conductive shunt layer (not shown) for shunt biasing the MR material in film 28.

Figure 3:
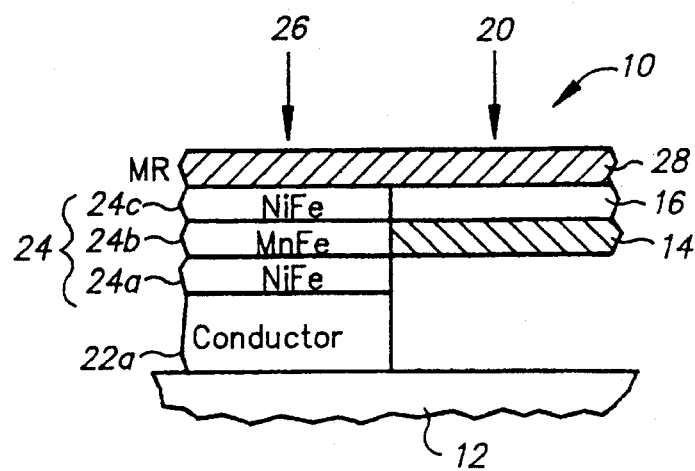
FIG. 3 depicts a preferred configuration for the exchange layer of the transducer shown in FIG. 2.

The NiFe/MnFe/NiFe structure constituting the exchange layer 24 is illustrated in FIG. 3. This structure consists of a NiFe seed layer 24a in direct contact with the under side of a film 24b of MnFe; and the upper side of the MnFe film contacts a NiFe film 24c that serves as a protective layer and directly contacts the MR layer 28. In this structure the MnFe film serves as an antiferromagnetic layer to ensure longitudinal biasing and the ability of the MR film 28 to sense flux transitions. Increasing the thickness of seed layer 24a improves the efficiency of the exchange by the MnFe film with the upper film 24c and improves the coercivity. The thicknesses of both NiFe films 24a, 24c can be adjusted to meet desired boundary conditions; i.e., the thicknesses of the layers in the central region 20 versus those in the end regions 26.

If desired, the exchange layer 24 may be a bias layer comprising a different seed layer (e.g. any appropriate face-centered-cubic metal), a different antiferromagnetic material (e.g., NiFeMn or NiMn) or a bias layer of hard magnetic material (e.g., a permanent magnet) deposited over a suitable nonmagnetic underlayer. This underlayer may be either separately deposited or included as part of the conductive material 22 used for the conductor leads 22a, 22b; e.g., Ta separately deposited or Ta included in a trilayer Ta/Au/Ta conductor lead material.

It will thus been seen that according to the invention, applicants' fabrication method involves no critical etching or additive steps and provides an improved MR read transducer 10 having an MR layer 28 in the form of a continuous thin film that serves as a continuous current-carrying platform without butted junctions in the current path. A capping layer 31 can readily be applied over the MR layer to protect it during subsequent processing. Use of the same mask 18, first in a subtractive mode, then in an additive mode, retains a configuration with aligned boundaries for the central region 20 and end regions 26. Finally, by use of a NiFe/MnFe/NiFe exchange layer 24 with NiFe as the seed layer 24a, higher exchange magnitude and higher coercivity are achieved at room temperature, exchange roll off as a function of temperature is reduced, and operation up to a higher blocking temperature is possible.

While the invention has been shown and described with respect to preferred embodiments thereof, it will be understood by those skilled in the art that changes in form and detail may be made without departing from the scope and teaching of the invention. Accordingly, the MR read transducer and method of fabricating same herein disclosed are to be considered merely as illustrative, and the invention is to be limited only as specified in the claims.

We claim:

1. A method of fabricating a magnetoresistive read transducer assembly, said method comprising the steps of:

(a) depositing on a substrate successively a layer of a first biasing material and then a nonmagnetic decoupling spacer layer;

(b) providing a masking means covering said layers only in a central region;

(c) removing those parts of said layers not covered by said masking means to define with remaining portions of said layers a transverse biasing means in the central region and define at each side of said central region passive end regions devoid of said layers;

(d) depositing over said masking means and over the end regions a conductive material and then a second biasing material;

(e) removing said masking means to define and provide only in said end regions (i) conductor leads in direct contact with the substrate and (ii) longitudinal biasing means overlying said conductor leads; and (f) depositing a magnetoresistive material in the form of at least one continuous thin film in direct contact with said nonmagnetic decoupling spacer layer in said central region and in direct contact with said longitudinal biasing means in said end regions to provide a continuous current-carrying platform.

2. The method of claim 1, including, following step (f), the step of:

applying a capping layer of protective material over the magnetoresistive material to protect it during subsequent processing.

3. The method of claim 1, wherein the first biasing material comprises a layer of soft magnetic material.

4. The method of claim 1, wherein the first biasing material comprises a conductive shunt layer for shunt biasing the magnetoresistive material.

5. The method of claim 1, wherein the first biasing material comprises a hard magnetic material.

6. The method of claim 1, including during step (d) sequentially depositing on the conductive material films of NiFe, MnFe and NiFe; and defining and providing by step (e) an exchange layer in which one of the NiFe films serves as a seed layer under the MnFe film and the other NiFe film is interposed as a protective layer between the MnFe film and magnetoresistive film to form the longitudinal biasing means.

7. The method of claim 1, including during step (d) sequentially depositing on the conductive material films of a face-centered cubic (fcc) metal, MnFe and NiFe; and defining and providing by step (e) an exchange layer in which the fcc metal serves as a seed layer under the MnFe film and the NiFe film is interposed as a protective layer between the MnFe film and magnetoresistive film to form the longitudinal biasing means.

8. The method of claim 1, including, during step (d), depositing on the conductive material an antiferromagnetic material as the second biasing material to form the longitudinal biasing means.

9. The method of claim 1, including, in during step (d), depositing on the conductive material a film of a hard magnetic material as the second biasing material to form the longitudinal biasing means.

10. The method of claim 1, including between steps (c) and (d), the step of using said masking means, depositing a planarizing layer of dielectric material only in the end regions to back fill for material excessively removed from the substrate during step (c).

* * * * *